Aug. 15, 1939.　　J. J. N. VAN HAMERSVELD　　2,169,748
MACHINE TOOL
Filed Dec. 28, 1937　　6 Sheets-Sheet 1
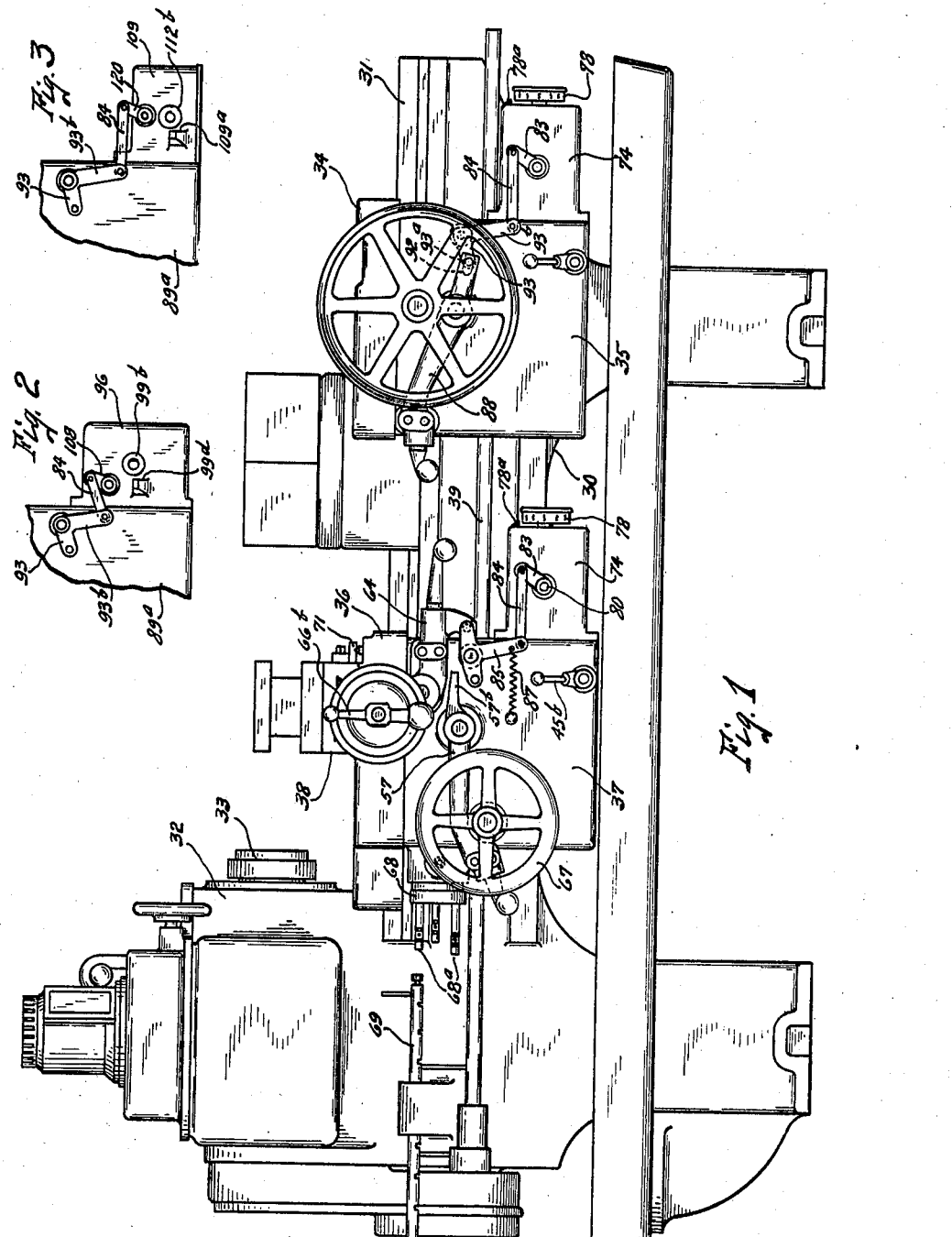
INVENTOR.
JOHN J. N. VAN HAMERSVELD
BY Kwis Hudson & Kent
ATTORNEYS

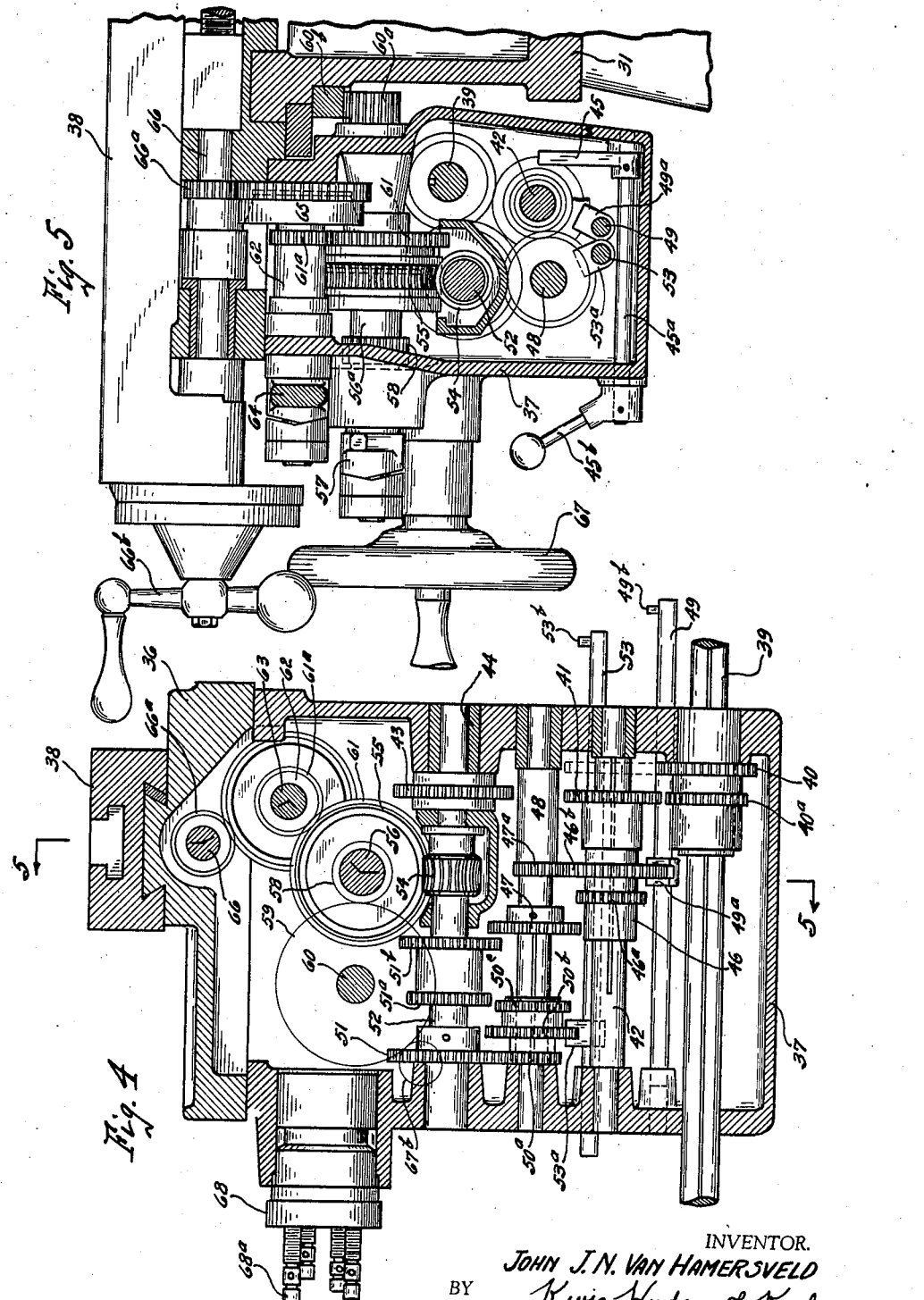

Aug. 15, 1939.   J. J. N. VAN HAMERSVELD   2,169,748
MACHINE TOOL
Filed Dec. 28, 1937   6 Sheets-Sheet 3
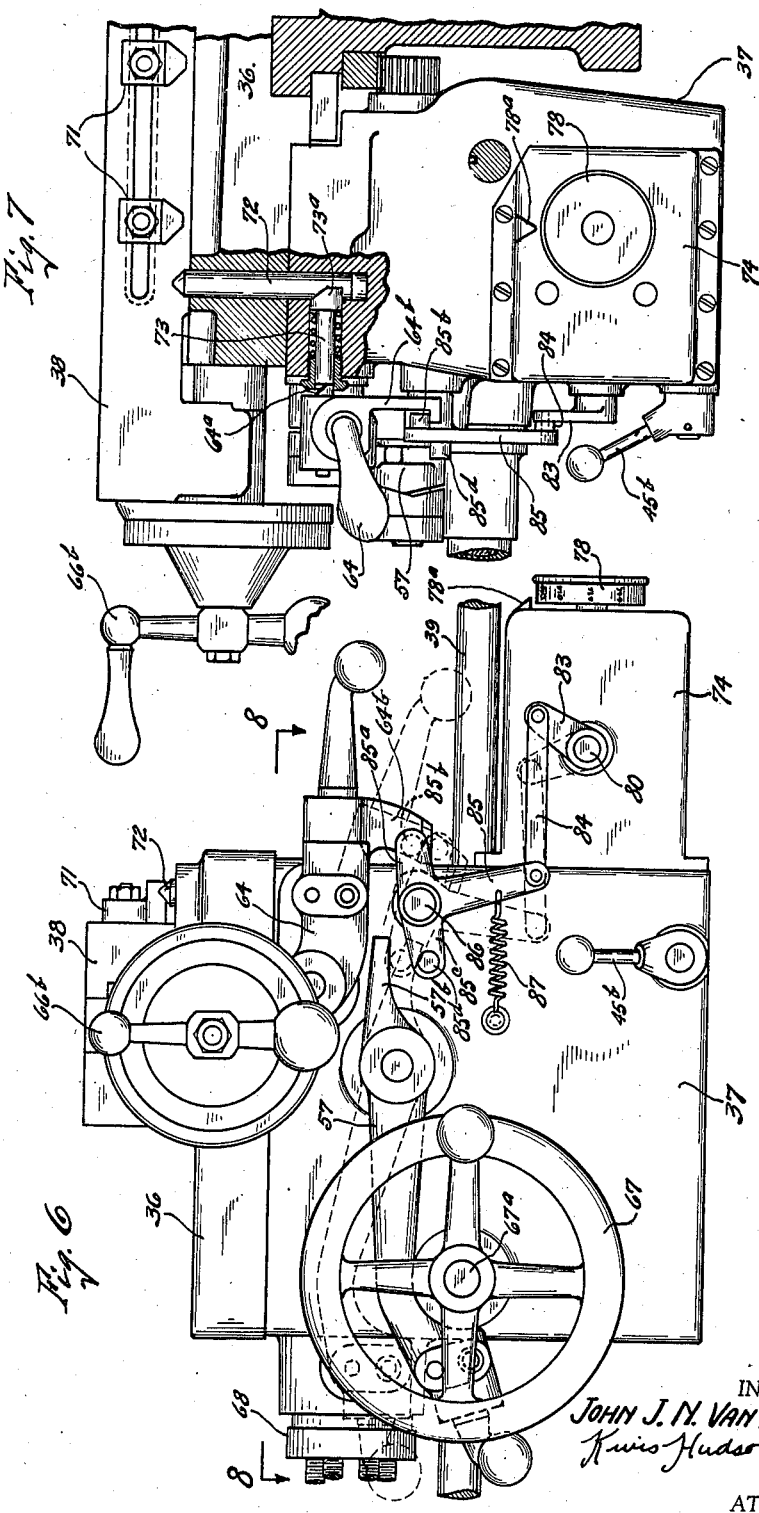
INVENTOR.
JOHN J. N. VAN HAMERSVELD
ATTORNEYS

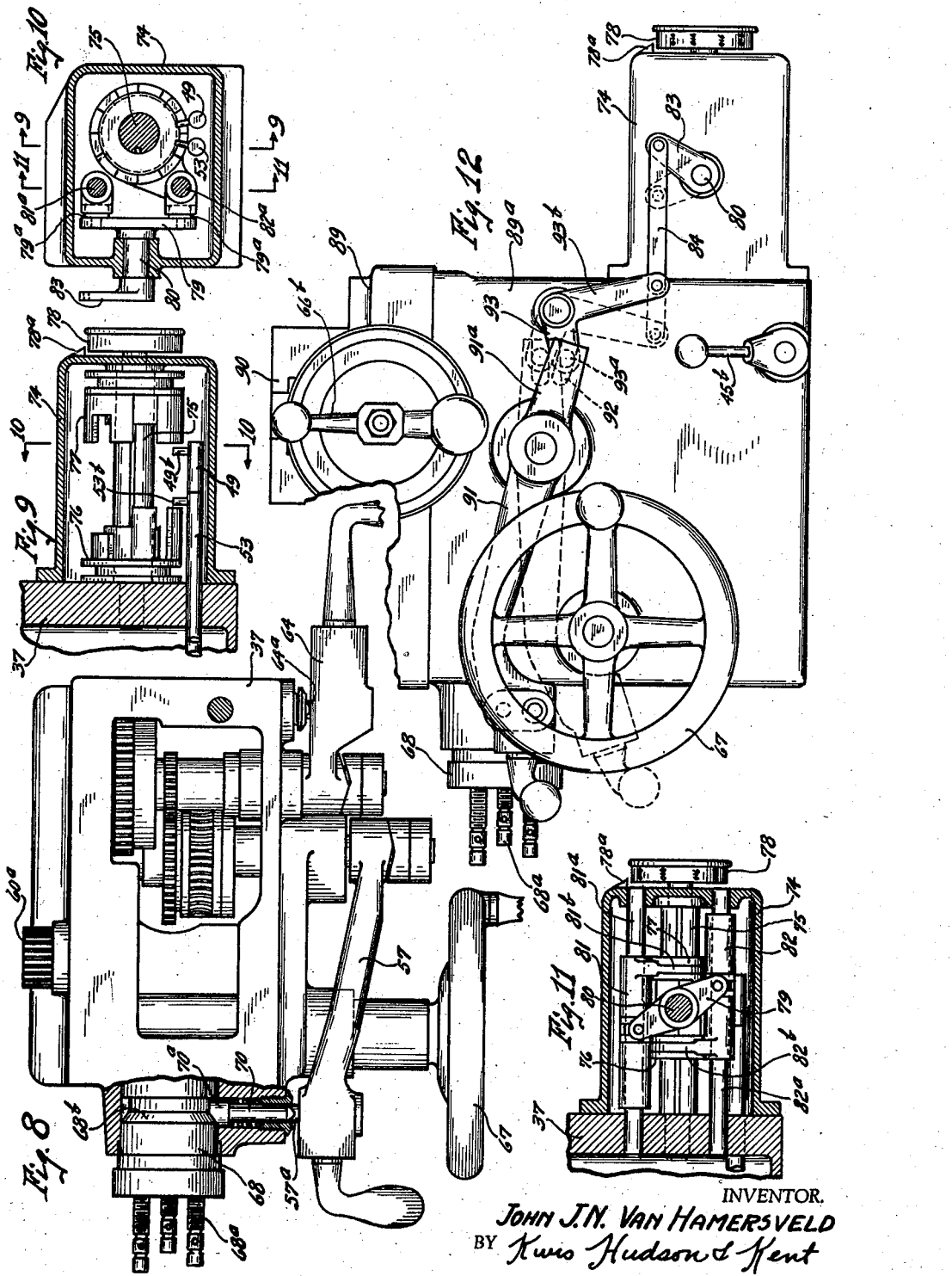

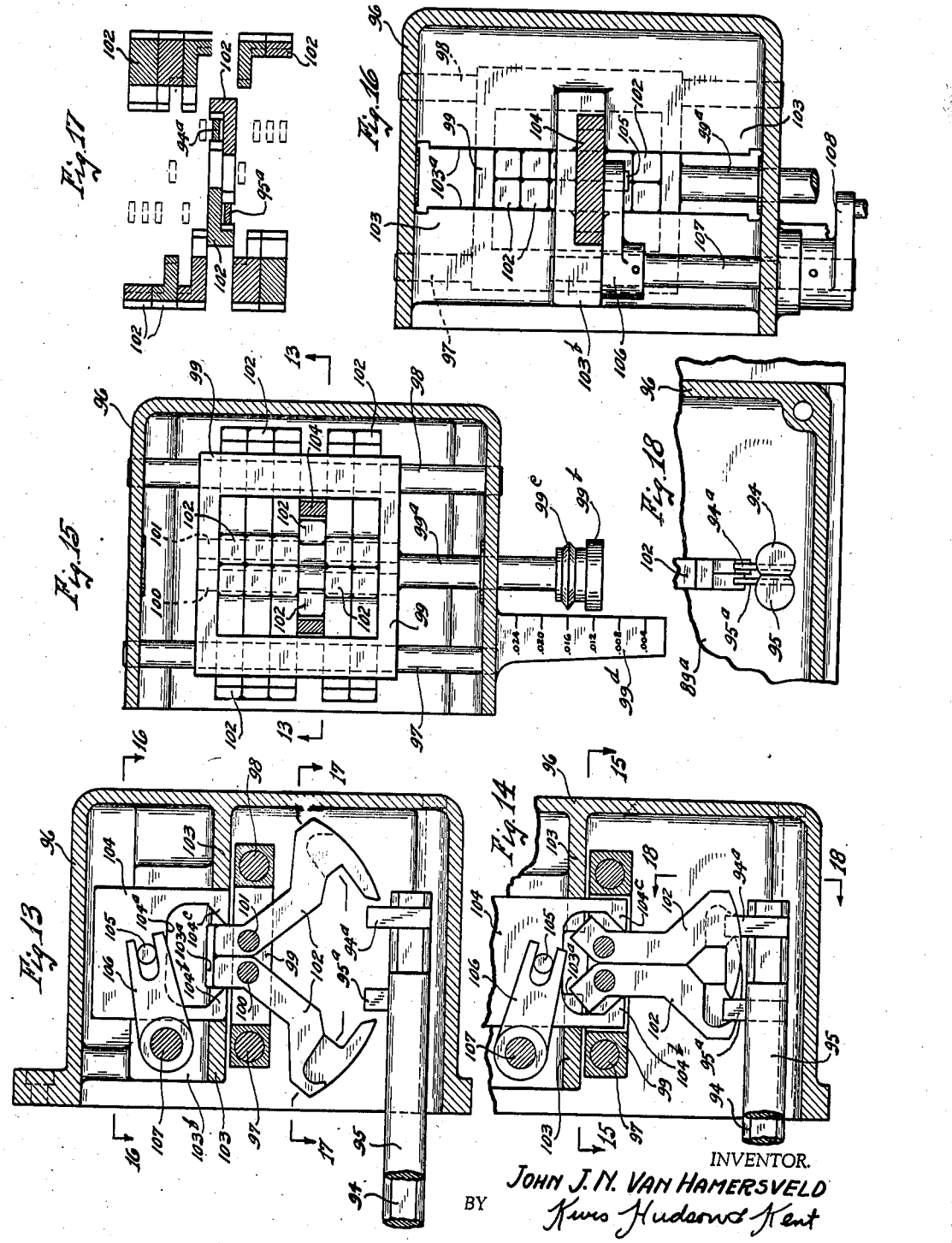

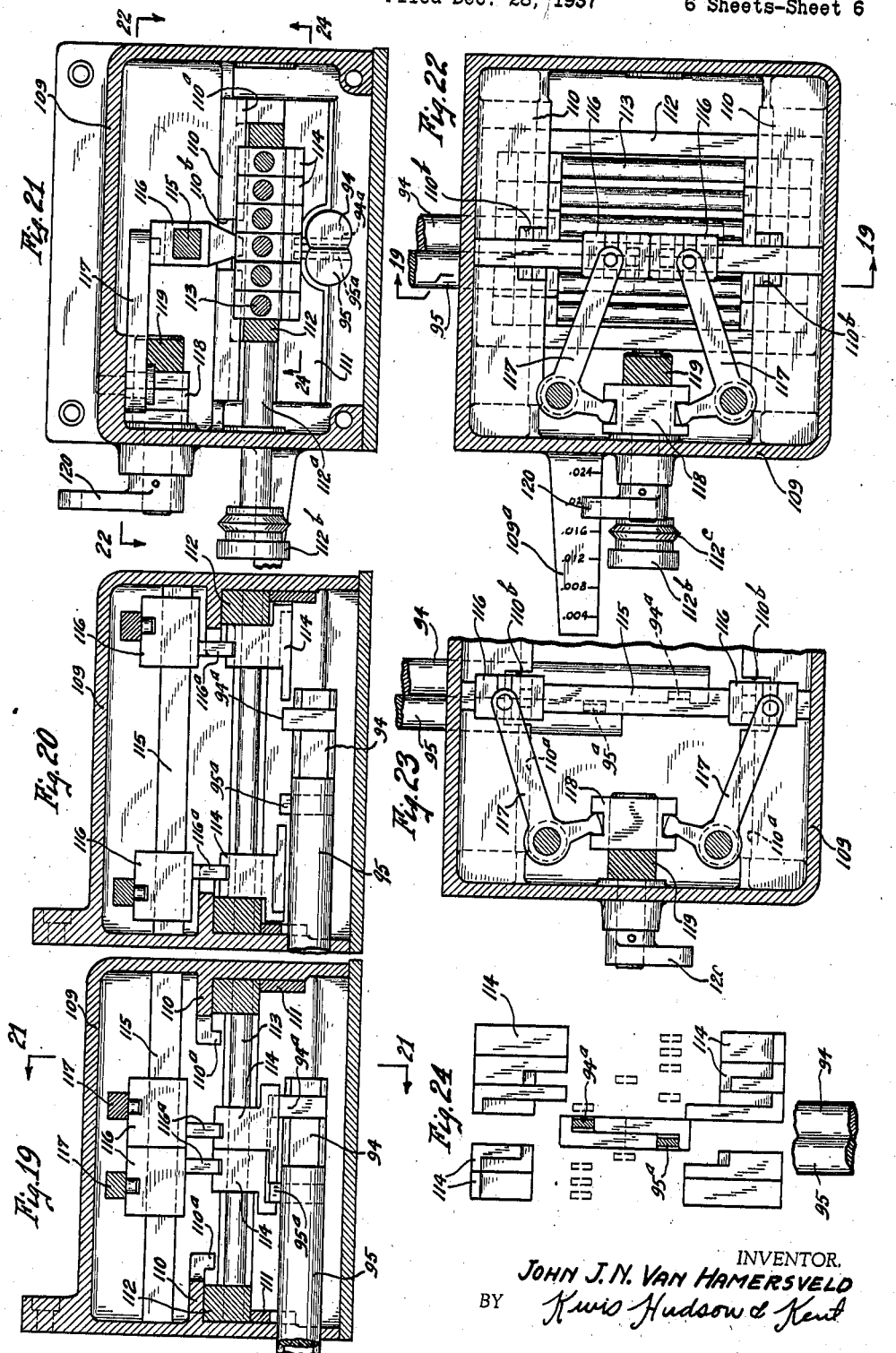

Patented Aug. 15, 1939

2,169,748

UNITED STATES PATENT OFFICE 2,169,748

MACHINE TOOL

John J. N. Van Hamersveld, Cleveland Heights, Ohio, assignor to The Warner & Swasey Company, Cleveland, Ohio, a corporation of Ohio Application December 28, 1937, Serial No. 182,104

41 Claims. (Cl. 29—46)

This invention relates to a machine tool, and particularly to mechanism for preselecting the rates of feeding movement of certain movable members of the machine and for effecting a change of rates of the feeding movement thereof to the preselected rates.

An object of the invention is to provide in a machine tool having a movable part which is given different rates of feeding movement and wherein a feed control lever is employed to connect and disconnect the change speed drive for said part to or from a power source, mechanism operatively associated with said drive and lever such that movement of the lever automatically changes the drive to impart a different rate of feeding movement to said part.

Another object of the invention is to provide in a machine tool having a movable part such as a slide, mechanism for preselecting the rate of feeding movement of said part and for effecting a change to the rate of feeding movement thus preselected, which mechanism in effecting the change to the preselected rate is controlled by a single control member that also controls the connection to and disconnection from the power source of the feeding drive train for said part.

Another object of the invention is to provide in a machine tool having a movable part such as a slide, mechanism for preselecting during one step of the operative work cycle the rate of feeding movement for said part for the following step of the operative work cycle and including means for effecting automatically a change to the preselected rate of feeding movement upon the termination of the feeding movement of said part for the first mentioned step of the operative work cycle.

A further object of the invention is to provide in a machine tool having a movable part such as a slide, mechanism associated with said part for preselecting during one step of the operative work cycle the rate of feeding movement for said part for the following step of the work cycle and including means automatically operable successively upon the completion of each step of the work cycle first to disconnect from the power source the feed train drive for said part and then to effect a change from the previous rate to the preselected rate of feeding movement of said part.

Another object is to provide in a machine tool having a cross slide, mechanism for preselecting during one operative step of the work cycle the rate of feeding movement of the cross slide for the following operative step of the work cycle and for effecting upon the termination of the feeding movement for the first named operative step a change to the preselected rate of feeding movement for the following operative step of the cycle, together with a single control member for disconnecting from the power source the feed train drive for said cross slide for controlling said mechanism in effecting the change to the preselected rate of feeding movement.

Another object of the invention is to provide in a machine tool having a cross slide, mechanism for preselecting during one operative step of the work cycle the rate of feeding movement of said slide for the following operative step of the cycle and including means automatically operable upon the termination of the feeding movement of the first named step to effect a change to the preselected rate of feeding movement of the cross slide for the following step.

A still further object is to provide in a machine tool having a compound slide one element of which is given a longitudinal power feeding movement and another element of which is given a crosswise power feeding movement, mechanism for preselecting during one operative step of the work cycle either a rate of longitudinal feeding movement for said first element or a rate of crosswise feeding movement for said second element for the following operative step of the work cycle, and then upon the termination of the first named operative step of the work cycle automatically effecting a change to either the preselected rate of longitudinal feeding movement of the first element or to the preselected rate of crosswise feeding movement of the second element.

A still further object is to provide in a machine tool having a compound slide to one element of which are imparted longitudinal power feeding movements and to another element of which are imparted crosswise power feeding movements, mechanism for preselecting during one operative step of a work cycle either the rate of said longitudinal feeding movement or the rate of the said crosswise feeding movement for the next operative step of the work cycle and including means automatically operable upon the termination of either the longitudinal or crosswise feeding movements of the previous step in the work cycle to disconnect from the power source the feed drive trains for either of said feeding movements and to then effect a change to the preselected rate of one or the other of the feeding movements as the case may be.

Another object is to provide in a machine tool having a compound slide each sliding element of which is given power feeding movements and wherein separate feed control levers are provided for said elements, a single mechanism automatically actuated by one or another of said control levers for preselecting during one operative step of the work cycle the rate of feeding movement to be imparted during the following operative step of the work cycle to one or another of said elements.

A still further object is to provide in a machine tool having a slide to which different rates of feeding movement are imparted, mechanism for preselecting during one operative step of the work cycle the rate of feeding movement for the following operative step of the cycle and for effecting a change to the preselected rate, which mechanism is of such character as to be readily incorporated in or applied to a part of the slide without interfering with the normal operation or functioning of the machine.

Another object of the invention is to provide in a machine tool having a part to be moved at different rates during the different steps of the work cycle, improved mechanism for preselecting during one operative step the rate of movement of said part for the following operative step and for effecting a change to the preselected rate, which mechanism is of such character that it can be housed in a minimum space.

Further and additional objects and advantages not hereinbefore referred to will become apparent hereinafter during the detailed description which is to follow of several embodiments of the invention.

Referring to the accompanying drawings illustrating certain embodiments of the invention, Fig. 1 is a front elevational view of a machine tool, in this instance a turret lathe, upon the bed of which is mounted a turret slide and a carriage having a cross slide, the invention being illustrated as applied to the turret slide, cross slide carriage and cross slide for preselecting and controlling the longitudinal feeding rates of movement of the turret slide and cross slide carriage and the crosswise feeding rates of movement for the cross slide.

Figs. 2 and 3 are detached fragmentary elevational views of two different preselecting units or mechanisms from the one shown in Fig. 1.

Fig. 4 is a developed view of the gearing in the apron of the cross slide carriage.

Fig. 5 is a vertical sectional view through the apron of the cross slide carriage and is taken substantially on irregular line 5—5 of Fig. 4 looking in the direction of the arrows.

Fig. 6 is a front side elevational view on an enlarged scale of the cross slide, cross slide carriage and apron shown in Fig. 1.

Fig. 7 is an end elevational view of the cross slide, cross slide carriage and apron and is taken looking from the right hand side of Fig. 6 with a portion of the carriage broken away and a portion of the bed being shown in section.

Fig. 8 is a top plan view of the apron for the cross slide carriage when said apron is removed from the carriage and can be considered as having been taken along line 8—8 of Fig. 6 looking in the direction of the arrows.

Fig. 9 is a longitudinal vertical sectional view through the preselecting unit or mechanism and is taken substantially on line 9—9 of Fig. 10 looking in the direction of the arrows, a portion of the cross slide carriage apron being shown in section.

Fig. 10 is a transverse vertical sectional view through the preselecting unit or mechanism and is taken substantially on line 10—10 of Fig. 9 looking in the direction of the arrows.

Fig. 11 is a longitudinal vertical sectional view through the preselecting unit or mechanism and is taken substantially on line 11—11 of Fig. 10 looking in the direction of the arrows.

Fig. 12 is a front side elevational view of the cross slide, cross slide carriage and apron therefor, but illustrates a construction where only a power feeding movement is imparted to the cross slide carriage, the cross slide having only a manually operated feeding movement; the construction shown herein being identical with that employed in connection with the preselecting mechanism or unit carried by the apron of the turret slide shown in Fig. 1.

Fig. 13 is a transverse vertical sectional view on an enlarged scale through the modified form of preselecting mechanism shown in Fig. 2, and is taken substantially on line 13—13 of Fig. 15 looking in the direction of the arrows.

Fig. 14 is a fragmentary sectional view similar to Fig. 13 with some of the parts of the preselecting unit or mechanism shown in a different position.

Fig. 15 is a horizontal sectional view through the preselecting mechanism or unit shown in Fig. 2 and is taken substantially on line 15—15 of Fig. 14 looking in the direction of the arrows.

Fig. 16 is a horizontal sectional view of the preselecting unit shown in Fig. 2 and is taken substantially on line 16—16 of Fig. 13 looking in the direction of the arrows.

Fig. 17 is a detached sectional view of certain parts of the preselecting unit shown in Fig. 2 and is taken along the irregular line 17—17 of Fig. 13 looking in the direction of the arrows.

Fig. 18 is a fragmentary sectional view taken substantially on line 18—18 of Fig. 14 looking in the direction of the arrows.

Fig. 19 is a transverse vertical sectional view through another modified form of preselecting unit or mechanism, i. e., the form shown in Fig. 3 and is taken substantially on line 19—19 of Fig. 22 looking in the direction of the arrows.

Fig. 20 is a view similar to Fig. 19 but shows certain of the parts in different relative position.

Fig. 21 is a longitudinal vertical sectional view taken on line 21—21 of Fig. 19 looking in the direction of the arrows.

Fig. 22 is a horizontal sectional view taken along lines 22—22 of Fig. 21 looking in the direction of the arrows.

Fig. 23 is a sectional view similar to the left hand end, as viewed in the drawings, of Fig. 22 and shows certain of the parts in different relative positions, and Fig. 24 is a detached sectional view taken along line 24—24 of Fig. 21 looking in the direction of the arrows.

Referring to Fig. 1, the invention is shown by way of illustration as applied to a turret lathe and which comprises a bed 30 provided with longitudinally extending ways 31 and having at one end a head 32 in which is mounted the usual work or tool spindle 33 that can be driven at a plurality of different speeds by suitable change speed gearing arranged in the head as will be well understood. A turret slide 34 is mounted on the ways 31 of the bed for movement longitudinally thereof and is provided at its front side with an apron 35. Intermediate the turret slide 34 and the head 32 there is slidably mounted on the ways 31 a cross slide carriage 36 that has a cross slide 30 and is provided at its front side with an apron 37. The turret slide 34, cross slide carriage 36 and cross slide 38 are moved for purposes of feeding by means of a feed shaft 39 that extends longitudinally of the front of the bed and is operatively connected at one of its ends through suitable gearing with the work spindle 33, as will be well understood. The feed shaft 39 is operatively connected with the turret slide 34, the cross slide carriage 36 and the cross slide 38 by means of suitable drive trains mounted in the turret slide apron 35 and in the cross slide carriage apron 37 as will also be understood and which will later be explained more in detail. Inasmuch as the drive train in the turret slide apron 35 and which operatively connects the turret slide with the feed shaft 39 is a substantial duplicate of the drive train in the cross slide carriage 37 when the power drive for the cross slide is omitted, it will only be necessary to explain herein in detail the drive train in the cross slide carriage apron 37 and for this purpose reference may be had particularly to Fig. 4 of the drawings which is a developed view of said drive train.

The feed shaft 39 has a splined connection with a rotatable gear sleeve mounted in the apron against endwise movement, as is well known in the art, and carrying two gears 40 and 40a. The gear 40 which is the larger gear meshes directly with a gear 41 carried on a sliding sleeve that is splined on the shaft 42 when said sleeve is shifted from the full line position of Fig. 4 to the dotted line position thereof to impart rotation to the shaft 42 in one direction. In order to reverse rotation of shaft 42 when the said sleeve and the gear 41 carried thereby is shifted to the full line position of Fig. 4, the drive from the said shaft 39 is through the smaller gear 40a which meshes with an idler gear 43 freely rotatable on a fixed sleeve 44, which idler gear 43 in turn meshes with the gear 41. The sleeve carrying the gear 41 is shifted from one to the other of the two positions referred to by means of a fork 45 (see Fig. 5) fixed to a rockable rod 45a that extends crosswise of the apron adjacent its lower end and projects outwardly of the front side thereof and has fixed to its outer end an operating lever 45b.

A shiftable two-step gear cone 46 is splined on the shaft 42 and includes a gear 46a and a gear 46b adapted to mesh respectively with gears 47 and 47a fixed to a shaft 48. The gear cone 46 can be shifted to either one of its two operative positions by means of a sliding rod 49 that is provided with a fork 49a straddling the gear 46b and said rod 49 projects beyond the wall of the apron for a purpose later to be described. It will be seen that the shaft 48 is driven at either one of two speeds in both directions from the shaft 42 through the gears 46a and 46b and 47 and 47a. A three-step shiftable gear cone 50 is splined on the shaft 48 and comprises the gears 50a, 50b and 50c which are adapted to be intermeshed, respectively, with gears 51, 51a and 51b fixed to a worm shaft 52. It will thus be seen that the worm shaft 52 can be driven by the shaft 48 at any one of three speeds, and since the shaft 48 can be driven by the shaft 42 at any one of two speeds the said worm shaft therefore can be driven at any one of six speeds in either the forward or reverse direction as will be understood. The three-step gear cone 50 is shifted by means of a slidable rod 53 that projects beyond the wall of the apron at one end thereof and which carries a fork 53a that straddles the gear 50b of the three-step gear cone.

One end of the worm shaft 52 is rotatably supported in the sleeve 44 and said shaft is provided intermediate the idler gear 43 and the gear 51b with a worm 54 that meshes with a worm wheel 55 that in turn constitutes the outer member of a friction cone clutch, the inner member of which is integral with a sleeve 56a that is splined on a shaft 56 for rotation therewith and endwise movement thereon. A control lever 57 is mounted on the front side of the apron and through the intermediary of suitable camming means controls the endwise movement of the sleeve 56a to effect an engagement or disengagement of the friction clutch as is well understood in the art and which, therefore, need not be explained in detail. A pinion 58 is fixed on the sleeve 56a and meshes with a gear 59, (see Fig. 4) fixed on a shaft 60 extending transversely of the apron and projecting from the rear side thereof and having on its projecting end an integral pinion 60a meshing with a longitudinally extending rack 60b fixed to the bed, wherefore it will be seen that rotation of the shaft 60 and pinion 60a will effect a longitudinal movement of the cross slide carriage along the ways 31 of the bed, as is well understood in the art. The outer member of the friction clutch that is mounted on the shaft 56 has fixed thereon a gear 61 that meshes with a pinion 61a fixed on a sleeve 62 that is splined on a shaft 63. The sleeve 62 is integral with the inner member of a friction cone clutch and can be moved endwise of the shaft 63 to effect an engagement or disengagement of said friction clutch by means of a control lever 64 mounted on the front of the apron and acting through suitable camming means upon the sleeve 62, all as will be well understood in the art. The outer member of the last referred to friction cone clutch is in the form of a gear 65 that meshes with a pinion 66a fixed to the screw shaft 66 and which screw shaft imparts the crosswise sliding feeding movement to the cross slide 38 in a manner well understood in the art. The screw shaft 66 extends outwardly of the front of the cross slide and has fixed thereto an operating handle 66b for imparting manual crosswise sliding movement to the cross slide. The cross slide carriage can also be given manually a longitudinal sliding movement by means of the hand wheel 67 located on the front side of the apron and fixed to a shaft 67a that carries a pinion 67b, see Figs. 4 and 6, meshing with the gear 59. The construction hereinbefore described is conventional and is well understood in the art.

When the control lever 57 is in the raised or dotted line position, as shown in Fig. 6, the friction clutch on the shaft 56 is engaged and a power feeding movement is being imparted to the cross slide carriage. The cross slide carriage is provided with a rotatable and endwise movable stop roll 68 that carries a plurality of stop screws 68a each of which can be selectively brought into line with an adjustable stop rod 69 carried by the bed, wherefore when the cross slide carriage is fed by power along the bed toward the head one of the screws 68a in line with the rod 69 will abut with the end of the said rod when the slide is nearing the end of its feeding movement and the remaining movement of the cross slide carriage will cause an endwise movement of the stop roll 68 with the result that a camming portion 68b on the roll 68 will act on a camming portion 70a on the end of a spring-pressed plunger 70 to force said plunger in an outward direction. The lever 57 is provided with a spring-pressed pin 57a which when the lever is in the raised or dotted line position of Fig. 6 projects into the opening in which the plunger 70 slides and acts to hold the lever in its raised or elevated position to maintain the engagement of the friction clutch on the shaft 56. However, as soon as the plunger 70 is forced outwardly by the camming portion of the spool 68 the pin 57a is pushed by the end of the plunger out of the bore and the lever 57 is then free to drop by gravity from the dotted line position to the full line position of Fig. 6, at which time the friction clutch on the shaft 56 is disengaged as is well understood. It will thus be seen that the power feeding movement of the cross slide carriage in a direction toward the head can be automatically stopped at different predetermined points according to the adjustment of the screws 68a and of the rod 69. Provision is also made for automatically stopping the power feeding movement of the cross slide 38 at different predetermined points of its movement in either direction. On the side of the cross slide 38 there are mounted adjustable dogs 71 which at their lower ends are provided with camming portions that cooperate with the camming portions on the upper end of a vertically extending slidable pin 72 mounted in the cross slide carriage and having at its lower end a notch receiving the camming portion 73a of a spring-pressed plunger 73. The control lever 64 is provided with a spring-pressed pin 64a that extends into the end of the bore in which the plunger 73 slides when said control lever is in the full line position as shown in Fig. 6, at which time the friction clutch on the shaft 63 is engaged and a power feeding movement is being imparted to the cross slide. When one or the other of the adjustable dogs 71 contacts with the upper end of the pin 72 the latter is depressed and due to a camming surface in the notch in said pin the plunger 73 is forced outwardly to, in turn, push the pin 64a out of the bore and to allow the control lever 64 to drop by gravity from the full line position to the dotted line position of Fig. 6, thus disengaging the friction clutch on the shaft 63 and terminating the power feeding movement of the cross slide. The mechanism for automatically stopping the power feeding movements of the cross slide carriage and the cross slide and which has just been described is also conventional and well understood in the art.

The construction now to be described and which cooperates with the control levers 57 and 64 constitutes the subject matter of the present invention and enables the preselection during one operative step of the work cycle of different feeding movements for either the cross slide carriage or the cross slide, and then upon the termination of said operative step functions to automatically obtain the preselected rate of feeding movement.

As already explained, the shiftable gear cones forming part of the power drive train in the apron for the cross slide carriage and the cross slide are shifted by means of the slidable rods 49 and 53 which project beyond the end wall of the apron into a housing 74 mounted on said end wall, see Figs. 1, 9 and 10.

Rotatably mounted in the housing 74 and in the end wall of the apron is a shaft 75 which has splined thereto for endwise movement thereon and rotation therewith a pair of spools 76 and 77, which spools on their adjacent faces are provided with cooperating series of long and short projections, short and long projections and projections of equal length. Inasmuch as the cross-slide carriage or the cross slide each can be given six different power feeding movements the spools 76 and 77 each are provided with 12 projections. These projections cooperate with the pins 49b and 53b carried by the outer ends of the slidable shifting rods 49 and 53, respectively, and located between the adjacent faces of the spools 76 and 77, as clearly shown in Fig. 9. The spools 76 and 77 are indexed by means of a dial 78 fixed to the shaft 75 and mounted exteriorly of the housing 74, said dial 78 bearing indicia indicating the different rates of feeding movements for either the cross slide carriage or the cross slide and which can be brought into alignment with a fixed pointer 78a mounted on the housing. It will be understood that rotation of the dial 78 to bring a number on the face thereof into alignment with the fixed pointer 78a and representing a certain feed for either the cross slide carriage or the cross slide causes a rotation of the spools 76 and 77 to index the same to position the cooperating pairs of projections in predetermined relationship. The indexing of the spools takes place when the spools which are splined on the shaft 75 have been moved to their most outward or separated position, as indicated in Fig. 9, and it will be understood that suitable spring points are provided for holding the spools in their various indexed positions. When the spools are moved inwardly or toward each other it will be understood that the cooperating projections engage with one or both of the pins 49b and 53b to shift the same and, in turn, to effect a shifting movement of the rods 49 and 53 to shift the two-step gear cone 46 and/or the three-step gear cone 50 as the case may be which shifting, of course, effects a change in the drive train for imparting the preselected rate of feeding movement to either the cross slide carriage or to the cross slide. The spools 76 and 77 are moved linearly toward and away from each other with an equalized movement by means of an equalizer bar 79 fixed on a stub shaft 80 that is rotatably mounted in a bearing boss formed in the housing 74, see Fig. 10. The equalizer bar 79 carries adjacent its opposite ends pivoted shoes 79a which are located in slots formed in elongated slidable sleeves 81 and 82 mounted on rods 81a and 82a which are supported in the housing and in the apron wall. The sleeve 81 is provided at its outer or right hand end, as viewed in Fig. 11, with a yoke 81b which straddles a groove in the spool 77. The sleeve 82 at its inner or left hand end, as viewed in Fig. 11, is provided with a yoke 82b, which straddles a similar groove in the spool 76. It will be seen that rotation of the shaft 80 will impart a rocking movement to the equalizer bar 79 and this movement, in turn, will cause an equalized linear movement of the sleeves 81 and 82 and also of the spools 76 and 77. The stub shaft 80 has fixed to its outer end exteriorly of the housing 74 a short lever arm 83 that has its outer end pivotally connected to one end of a link 84, the opposite end of which is pivotally connected to the lower and longer arm 85 of a three arm lever that is pivotally mounted on a bearing pin 86 carried by the front face of the apron 37 of the cross slide. The short arm 85a of the three arm lever is provided adjacent its outer end and on its rear face with a pin 85b that cooperates with a laterally projecting end portion of the downward extension 64b of the control lever 64, which lever it will be recalled controls the engagement or disengagement of the friction clutch on the shaft 63 to, in turn, control the feeding movement of the cross slide. The short arm 85c of the three arm lever is provided adjacent its end and on its face with a pin 85d that cooperates with an extension 57b of the lever 57, which lever controls the clutch on the shaft 56 and, in turn, the feeding movement of the cross slide carriage. A spring 87 is connected to the long arm 85 of the three arm lever and to the apron of the cross slide carriage and acts to maintain the three arm lever, the link 85 and the lever arm 83 in the dotted line position shown in Fig. 6 unless the three arm lever is moved or restrained from movement by the levers 64 and 57. When the three arm lever is in the dotted line position of Fig. 6 the spools 76 and 77 are in their most inward position (see Fig. 11) and have effected a shifting of the rods 49 and 53 and, in turn, the gear cones associated therewith to obtain the preselected feeding movement. When the three arm lever, link 84 and lever arm 83 are in the full line position of Fig. 6 the spools 76 and 77 are in their most outward position (see Fig. 9) and can then be indexed by the dial 78 to preselect the rate of feeding movement for either the cross slide carriage or the cross slide.

It will be recalled that both the levers 57 and 64 are automatically released from their raised or operative positions when the cross slide carriage reaches the end of its feeding movement or when the cross slide reaches the end of its feeding movement in opposite directions. It will also be understood for practical purposes that the levers 57 and 64 will never both be in their raised or operative positions at the same time, since the cross slide carriage and the cross slide are given individual feeding movements at different times. However, if for some special reason the levers 57 and 64 should both be engaged at the same time the three armed lever 85 would simply be moved to the full line position of Fig. 6. It will be noted that when the control lever 57 is in its raised or operative position (dotted line position of Fig. 6) its extended end 57b has engaged the pin 85d carried on the outer face of the short arm 85c of the three arm lever and has rocked said lever in a counter-clockwise direction against the action of the spring 87, that is, has rocked said lever to the full line position of Fig. 6, at which time the preselecting spools 76 and 77 are in their most outward position and can be indexed to preselect a different rate of feeding movement for the cross slide carriage. When the lever 57 is in the raised or dotted line position of Fig. 6, as just referred to, the cross slide carriage is being given a feeding movement toward the head stock of the machine. As soon as this feeding movement has been completed the lever will automatically be released and will fall by gravity to its lower or full position of Fig. 6, as has been previously explained, whereupon the extended end 57b will move in a direction away from the pin 85d and thus allow the spring 87 to rock the three arm lever in a clockwise direction, that is to the dotted line position of Fig. 6, to effect an inward movement of the spools 76 and 77 and, in turn, to actuate or shift the gear cones in the apron to obtain the rate of feeding movement which has been preselected.

If the rate of feeding movement thus preselected is to be imparted to the cross slide carriage, the operator manually raises the control lever 57 to the dotted line position of Fig. 6 to restore the feeding drive to the cross slide carriage.

However, if the rate of feeding movement thus preselected is to be imparted to the cross slide the operator allows the control lever 57 to remain in its lower or inoperative position and manually raises the control lever 64 from its lower or dotted line inoperative position to its raised or full line operative position of Fig. 6, whereupon the drive is completed to the cross slide and a feeding movement imparted thereto. This manual raising of the control lever 64 causes the lateral projection on the lower end of the extension 64b of the lever to engage the pin 85b mounted on the rear face of the arm 85 of the three armed lever and to rock the same against the action of the spring 87 in a counter-clockwise direction, that is from the dotted line position to the full line position of Fig. 6 to thus cause the spools 76 and 77 to move to their most outward position and one wherein they can be indexed by the dial 78 to preselect a different rate of feeding movement for the next operative step. As soon as the cross slide has completed its feeding movement at the preselected rate in one or the other direction, the lever 64 is automatically tripped, as has already been explained, and rocks by gravity from the raised position to the lower or dotted line position of Fig. 6, whereupon the spring 87 can rock the three armed lever in a clockwise direction, that is from the full line position to the dotted line position of Fig. 6 and cause the spools 76 and 77 to move to their most inward position to thus effect an actuation or shifting of the gear cones in the apron to obtain the preselected rate of feeding movement for the next operative step.

It will be noted when either the cross slide carriage or the cross slide, as the case may be, completes its feeding movement that said movement is automatically stopped and the spools 76 and 77 automatically brought to their most inward position to actuate or shift the change speed gearing in the apron to obtain the rate of feeding movement which has been preselected during the feeding movement just terminated. Then when the operator in order to initiate the next or preselected rate of feeding movement for either the cross slide carriage or the cross slide manually raises either the lever 57 or the lever 64, the spools 76 and 77 are restored to their most outward or indexing position so that the operator during the instant feeding movement can preselect a rate of feeding movement by rotating the dial 78 for the next or following operative step or feeding movement.

It will be seen that the operator manually moves the feed control levers 57 and 64 to their operative positions and manually indexes the spools to preselect the rate of feeding movement for the next step but that the shifting of the gear cones to obtain the preselected rate occurs automatically when the carriage or cross slide has finished its prior feeding movement.

A preselecting mechanism like the preselecting mechanism hereinbefore described is utilized with the turret slide, but since longitudinal feeding movement only is imparted to the turret slide there is only a single control lever 88 carried by the apron of the turret slide, and hence such single control lever can be operatively associated with the preselecting mechanism in an advantageous manner, as will now be pointed out. However, in order to avoid repetition and needless duplication of details in the drawings, the single control lever and the operative connections between the same and the preselecting device which is used on the apron of the turret slide are illustrated herein in Fig. 12 as applied to the apron 89a of a cross slide carriage 89 of the type wherein the cross slide 90 is manually given its feeding movement, wherefore only a longitudinal power feeding movement is imparted to the cross slide carriage, thus making this type of cross slide carriage comparable to the turret slide.

It will be understood that suitable stop roll mechanism, well known in the art, or its equivalent is provided in connection with the turret slide apron for automatically tripping or releasing the control lever 88 when the turret slide has completed its feeding movement, but for the sake of simplicity the previously described stop roll mechanism of the cross slide carriage, as shown in Fig. 12, will be considered in connection with the automatic tripping of the control lever 91 that controls the starting and stopping of the drive train for the cross slide carriage it being understood that the control lever 91 is identical in structure with the control lever 88 shown on the apron of the turret slide.

The control lever 91 has an extension 91a which is, adjacent its outer end, provided with an elongated groove 92 into which extends a pin 93a carried by the end of one arm 93 of a bell crank lever that takes the place of the three armed lever previously referred to and which has its other or longer arm 93b pivotally connected to the link 84. It will be seen that the raising or lowering of the lever 91 to either its full line position of Fig. 12 or to its dotted line position causes the bell crank lever, as shown in said Fig. 12, to, in turn, effect a positive movement of the link 84 and lever arm 82 and an endwise movement of the preselecting spools 76 and 77 in one or the other direction as the case might be.

When the lever 91 is in its raised or full line position the feed drive to the cross slide carriage is functioning and at this time the spools 76 and 77 are in their most outward position and can be indexed by the dial 78 to preselect the rate of feeding movement for the next feeding operation. As soon as the cross slide carriage 89 has completed its feeding movement the lever 91 is automatically tripped by the stop roll 68 and falls by gravity to the dotted line position of Fig. 12, with the result that the spools 76 and 77 are automatically and positively brought inwardly to actuate the shifting of the change speed gearing to obtain the preselected rate of feeding movement. The same mode of operation exists with respect to the preselecting mechanism and its operative association with the control lever 88 on the apron of the turret slide, it being noted that wherever the parts are similar the same reference characters have been employed on the turret slide as have been hereinbefore employed in the description of the mechanism on the cross slide apron.

It will be noted that in the mechanism described in connection with Fig. 12 the preselecting spools are positively moved endwise in both directions, whereas in the mechanism previously described herein, and as clearly shown in Fig. 6, the preselecting spools are positively moved endwise in one direction, but are moved by the spring 87 endwise in the opposite direction.

In many instances, due to limited space and clearances, it is necessary that the preselecting mechanism be of such character that it can be contained or housed within a relatively short or small housing, and in Figs. 2 and 13 to 18 inclusive there is shown a novel preselecting mechanism of this character.

Slidable shifting rods 94 and 95 similar in function to the shifting rods 49 and 53 previously described and having similar operative connections to the shiftable gear cones in the apron extend from the end of the apron into the relatively short housing 96 of the preselecting mechanism, as clearly shown in Fig. 13. The rods 94 and 95 are arranged closely together and are provided on their adjacent sides with flats, as indicated in Fig. 18, to enable said rods to be so closely positioned with respect to each other as to slide in contact with one another. These rods adjacent their ends are provided with slots in which are secured vertically extending pins 94a and 95a, it being noted that said pins are so mounted as to lie closely adjacent to the longitudinal center line of the rods, as shown in Fig. 18.

The housing 96 has mounted therein substantially midway of its lower and upper walls a pair of parallel horizontally fixed rods 97 and 98 that extend transversely of the housing. A substantially rectangular frame 99 is slidably mounted on the rods 97 and 98, being provided for this purpose with bores in the sides of the frame that slidably fit said rods. The frame 99 is provided with a forward centrally disposed extension or rod 99a that projects through an opening in the front wall of the housing 96 and carries at its outer end a knob 99b from which it will be readily seen that said frame can be shifted from exteriorly of the housing backwardly and forwardly on the rods 97 and 98 for a purpose later to become apparent.

Fixedly mounted in the frame 99 and located closely adjacent to each other are bearing pins 100 and 101 that extend horizontally in parallel relationship with the rods 97 and 98 and are located substantially midway between the rods 97 and 98. Rockably supported upon the pins 100 and 101 are a plurality of pairs of camming members 102, there being in this instance six pairs of such camming members for effecting six different rates of feeding movement. The lower ends of the camming members 102 are formed to provide cooperating pairs of long and short projections or camming portions, short and long projections or camming portions, or projections or camming portions of equal length, which portions are adapted to be brought selectively into a position with respect to the pins 94a and 95a of the rods 94 and 95 to enable said portions to be brought into camming engagement with said pins to cause a shifting movement of the rods 94 and 95 to, in turn, effect a shifting movement of the slidable gear cones in the apron.

The camming portions of the camming members 102 just referred to are clearly shown in section in Fig. 17, which is a view taken along the irregular line 17—17 of Fig. 13, it being noted that the pins 94a and 95a are shown in dotted lines with respect to the various pairs of camming members, to indicate the manner in which the cooperating projections on the camming portions thereof will act upon said pins when brought into indexed position and then brought inwardly.

It will be seen that the operator by moving the knob 99b inwardly or outwardly can position various pairs of the camming members 102 in an indexed relationship with the pins 94a and 95a, so that when said camming members which are normally held in an outwardly swung or inactive position, as indicated in Fig. 13, are brought inwardly the projections of the camming portions thereof will engage with said pins and effect a shifting movement of the rods and, in turn, a shifting movement of the gear cones in the apron. The knob 99b is provided with a beveled edge portion 99c forming a pointer that can be positioned in line with graduations indicating various rates of feeding movement and arranged on a forwardly extending arm or bracket 99d carried at the front side of the housing 96.

The housing 96 above the rods 97 and 98 is provided with a pair of spaced parallel horizontal ribs 103 forming therebetween an elongated slot 103a (see Fig. 16). The ribs 103 intermediate their rear and front ends are interconnected by a vertically extending integral U-shaped portion 103b that forms a supporting guide for an actuating slide 104, it being noted that the ribs 103 and the U-shaped portion 103b are cut away wider than the slot 103a to accommodate said actuating slide 104, and that the latter in its raised position, as shown in Fig. 13, extends above the U-shaped portion 103b.

The lower end of the actuating slide 104 is provided with an opening 104a forming spaced legs on the slide that have at their lower ends inwardly extending camming portions 104b and 104c. When the slide 104 is in its raised position, as shown in Fig. 13, the camming portions 104b and 104c are in engagement with the sides of the camming members 102 above their pivotal connections to the bearing pins 100 and 101 and said camming portions hold the camming members in spread or inoperative position. When the slide 104 is lowered, as will later be explained, the camming portions 104b and 104c ride along the sides of the camming members 102, and when the portions have passed the pivotal axis of the members they cause the lower ends of the latter to move inwardly toward each other with an equalized movement to bring the projections on said ends of the camming members into engagement with the pins 95a and 94a of the rods 95 and 94 to cause a shifting movement of said rods to in turn effect a shifting of the gear cones on the apron. In other words, when the slide 104 moves downwardly the camming members 102 are moved from the position shown in Fig. 13 to the position shown in Fig. 14. It will be understood that only one pair of camming members are moved at a time by the movement of the slide 104, since the thickness of the slide corresponds to the thickness of the camming members of each pair, while the other pairs of camming members have their upper ends positioned in the elongated slot 103a, see Fig. 16, and are held in the spread apart or inoperative position. It will further be understood that when the knob 99b is moved inwardly and outwardly that various pairs of the camming members can be selectively positioned beneath the slide and that the remaining pairs of the camming members will be held in open or inoperative position by the walls of the slot 103a.

Reference to Fig. 14 will indicate that when the pair of camming members beneath the slide are in the closed or operative position their upper ends are angularly disposed and are wider than the width of the slot 103a, and hence the knob 99b cannot be moved endwise to impart an endwise movement to the frame. It is only when the camming members have been moved to open or inoperative position, as shown in Fig. 13 and wherein their upper ends can readily slide in the slot 103a and between the camming portions 104b and 104c which form a continuation of the seat, that the knob 99b can be moved inwardly or outwardly to shift the frame 99 and index the pairs of camming members.

The slide 104 is provided with a pin 105 that extends into the forked end of a lever arm 106 fixed to a shaft 107 and projecting outwardly of the housing 96 at the front of the machine and having secured to its outwardly projecting end a lever arm 108 in turn pivotally connected to the link 84.

It will be seen that when the link 84 is moved by the disengagement of the feed control levers 57, 64, 88 or 91, as previously described, the shaft 107 will be rocked in a direction to cause a downward movement of the slide 104 and, in turn, a movement of the camming members 102 to effect a shifting of the rods 94 and 95. It will also be understood that when said feed control levers are moved to their upper or operative positions the shaft 107 will be rocked through the link 84 in a direction to cause movement of the slide 104 to its uppermost position, as shown in Fig. 13, at which time the knob 99b can be shifted to index the camming members 102 and bring the desired pair into position beneath the actuating slide 104, wherefore when the slide again descends the desired rate of feeding movement will be automatically obtained.

In Figs. 3 and 19 to 24 inclusive there is illustrated another form of preselecting mechanism and one which can be advantageously used under certain conditions, inasmuch as it is very compact and occupies a minimum amount of space. The preselecting mechanism now to be described comprises a housing 109 that is secured to the side of the apron and into which project the rods 94 and 95 carrying, respectively, the pins 94a and 95a, as previously described, it being recalled that said rods are provided within the apron with means operatively connecting them to the shiftable gear cones, wherefore movement of the rods effects shifting movement of the gear cones. The side walls of the housing 109 are provided intermediate their ends with inwardly extending horizontally aligned ribs 110 having at their inner or free ends a downwardly extending tongue 110a. The ribs 110 intermediate the front and rear of the housing are provided with aligned cut-outs or recesses 110b for a purpose later to be explained. The ribs 110 with the side walls of the housing and with detachable strips 111 secured to the inner sides of the side walls form a horizontal guideway for a rectangular frame 112 that can be moved backwardly and forwardly in the housing. The frame 112 is provided midway on its front side with a forwardly extending rod 112a that projects outwardly of the housing and is provided at its outer end with a knob 112b having a beveled portion 112c acting as a pointer to cooperate with graduated indicia arranged on a rigid arm 109a projecting outwardly of the front side of the housing 109.

It will be understood that when the knob 112b is moved inwardly or outwardly the frame 112 is correspondingly moved and that its location within the housing can be determined by positioning the portion 112c in line with the different graduations on the arm 109a. The frame 112 carries a plurality of parallel cross rods 113, there being in this instance six of these rods, since six different rates of feeding movement are imparted to the cross slide carriage, cross slide or turret slide as the case may be.

On each of the rods 113 there is slidably mounted a pair of cam blocks 114, said blocks having at their lower ends projections extending toward each other. The six pairs of cam blocks have the projections arranged in cooperating pairs of long and short projections, short and long projections and projections of equal length. It will be understood that these projections cooperate with the pins 94a and 95a on the rods 94 and 95 to cause a shifting movement of said rods in the manner later to be explained.

The projections or camming portions of the camming blocks 114 are clearly shown in bottom plan view in Fig. 24, which is taken along the line 24—24 of Fig. 21, it being noted that the pins 94a and 95a are shown in section in full lines with respect to one pair of projections and in dotted lines with respect to the other pairs of projections to indicate the positions to which the pins will be shifted by said projections when the latter are brought into indexed position, and then moved inwardly toward each other.

A square bar 115 is mounted in the housing to extend transversely thereof and is located above the ribs 110 and in vertical alignment with the cut-out or recesses 110b formed in said ribs, the bar 115 being parallel to the rods 113 carried by the frame 112. A pair of shifting blocks 116 are slidably mounted on the bar 115 for equalized movement thereon and are provided on their undersides with downward extensions 116a that are adapted to be engaged in slots formed on the upper sides of the camming portions 114, as clearly indicated in Figs. 19 and 20. The downward extensions 116a of the shifting blocks when the latter are in their most outward position, as indicated in Fig. 20, lie within the cut-outs or recesses 110b and in line with the downwardly extending tongues 110a of the ribs 110 and forming a continuation thereof. The slots formed in the upper side of the camming blocks 114 engage with the downwardly extending tongues 110a of the ribs 110 and when the frame 112 is shifted backwardly and forwardly in the housing different pairs of the camming blocks will be brought into the cut-outs or recesses 110b, at which time the slots in their upper sides will ride off of the tongues 110a and onto the downward extensions 116a of the shifting blocks 116.

From the foregoing it will be noted that the shifting blocks 116 can, therefore, when moved toward each other effect a similar movement of the particular pair of camming blocks 114 with which the downward extensions 116a are engaged, while the other pairs of camming blocks 114 remain in their most outward position and are held against movement on the rods 113 by the tongues 110a engaging in the slots in the upper sides of the blocks. The shifting blocks 116 are given an equalized movement on the bar 115 by means of a pair of bell-crank levers 117 that are pivotally mounted in the top of the housing and carry at the inner neds of their longer arms downwardly projecting pins engaging in slots formed in the upper side of the blocks 116. The shorter arms of the bell-crank levers 117 are provided at their outer ends with rounded or spherical portions that engage in recesses formed on opposite sides of a nut 118 the upper side of which is flat and bears against the underside of the top of the housing and is, therefore, held against rotation (see Fig. 21). The nut 118 is carried on a steep threaded screw 119, one end of which is reduced in the form of a shaft that extends outwardly of the housing through a bearing boss located on the front of the housing. The outer or reduced end of the screw 119 has fixed thereto a lever arm 120 which, in turn, is pivotally connected to the link 84 previously described.

It will be understood when the screw 119 is partially turned the nut 118 will be moved axially thereof to cause, through the bell crank levers 117, an inward or outward equalized movement of the shifting blocks 116 and, in turn, an equalized movement of the particular pair of cam blocks 114 with which the extensions 116a are engaged.

The link 84 is shown in Figs. 2 and 3 as connected to the bell crank lever 93, 93b, but it will be understood that the link 84 could be connected to a three-armed lever, such as the lever 85 shown in Fig. 6 when the preselecting mechanism is used to preselect the rates of movement of both a power driven cross slide carriage and a power driven cross slide.

It will be seen when the link 84 is moved by the disengagement of the feed control levers 57, 64, 88 or 91, as previously described, the steep threaded screw 119 will be rocked in a direction to cause an outward movement of the nut 118, and, in turn, a swinging movement of the bell cranks 117 to cause an equalized movement of the blocks 116 toward each other to effect a similar equalized movement of the cam blocks 114 (see Fig. 22). This movement of the cam blocks 114 brings the camming portions thereof into operative engagement with the pins 94a and 95a on the rods 94 and 95 to effect a shifting movement of the latter to, in turn, bring about a shifting of the gear cones in the apron.

It will be understood that when the feed control levers above referred to are moved to their upper or operative positions the screw 119 will be rocked through the link 84 in a direction to cause an inward movement of the nut 118 and, in turn, through the levers 117 and shifting blocks 116, an equalized outward movement of the cam blocks 114 until said blocks are in the position shown in Fig. 20. At this time the grooves in the upper side of the blocks are in alignment with the tongues 110a and the frame 112 can be shifted by the knob 112b to bring another pair of cam blocks in position in the opening 110b, whereupon the grooves in the upper side of said cam blocks will be in engagement with the extensions 116a of the shifting blocks 116, wherefore said pair of cam blocks will move with the shifting blocks toward and away from each other when the screw 119 is again rocked in opposite directions by the link 84, as above explained.

It will be understood that suitable spring points will be provided in all of the different forms herein illustrated and described for holding the moving parts thereof in different positions of adjustment, as will be well understood and is known in the art. It will also be understood that it is within the contemplation of the present invention to employ in place of the linearly indexible supports for the actuating members of the selecting mechanism supports which may be indexed in some other way as, for example, by rotative or rocking movements.

From the foregoing description it will be noted that the automatic knocking out of the feed control lever at the termination of one feeding movement of the slide automatically shifts the feed change gearing in the apron to obtain the next and different feeding movement thereof.

It will be seen that in the different forms of mechanisms herein described provision is made for manually preselecting during one feeding movement of a slide the next rate of feeding movement therefor and for automatically obtaining the preselected rate of feeding movement for the slide upon the completion of the prior feeding movement thereof. The automatic obtainance of the preselected rate of feeding movement is brought about through an operative association between the preselecting mechanism and the feed control lever for the slide, wherefore when the feeding movement of the slide is completed and the feed control lever automatically disengaged the preselecting mechanism is automatically actuated by said disengagement of the feed control lever to obtain the preselected rate of feeding movement for the next operative step.

It will also be noted that when the feed control lever for the slide is manually restored to operative position to initiate the next feeding movement of the slide that such movement of the lever restores the preselecting mechanism to the position in which it can be manually indexed to preselect the succeeding rate of feeding movement for the slide.

It will be seen that the movement of the single control member, namely, the feed control lever, not only engages and disengages the feed drive and the power source but also causes a shifting of the change speed gearing in said drive to obtain different rates of feeding movement.

It will also be noted that although the preselecting mechanisms shown in Figs. 13 to 24 inclusive are illustrated and described in connection with preselecting different rates of feeding movement for a slide that such mechanisms could be advantageously used for preselecting the different rates of movement of other movable parts of a machine tool, and particularly wherein it was desired or necessary to employ, due to limitations of space, a preselecting mechanism that is compact.

Although several embodiments of the invention have been illustrated and described herein, it will be understood that the invention is susceptible of various modifications and adaptations within the scope of the appended claims.

Having thus described my invention what I claim is:

1. In a machine tool having a movable part, a drive for said part, change speed gearing for imparting different rates of feeding movement to said drive and part, a power source for said gearing, means for connecting and disconnecting said gearing and said drive including a feed control lever, mechanism for shifting said gearing to obtain different rates of feeding movement for said part, and means interconnecting said mechanism and said control lever such that movement of the latter actuates said mechanism.

2. In a machine tool having a movable part, a drive for said part, change speed gearing for imparting different rates of feeding movement to said drive and part, a power source for said gearing, means for connecting said drive and said gearing and for automatically disconnecting the same at the completion of a feeding movement of said part, mechanism for shifting said gearing, and means operatively connecting said mechanism and said means such that said mechanism is automatically actuated when said drive and gearing are automatically disconnected.

3. In a machine tool having a movable part, a drive for said part, change speed gearing for imparting different rates of feeding movement to said drive and part, a power source for said gearing, means for connecting and disconnecting said drive and gearing, a feed control lever for actuating said means, means for automatically moving said lever upon the completion of a feeding movement of said part to disengage said drive and gearing, mechanism for shifting said gearing to obtain different rates of feeding movement, and means operatively connecting said mechanism and said lever such that the said automatic movement of said lever automatically actuates said mechanism to shift said gearing.

4. In a machine tool having a movable part, a drive for said part, means for imparting different rates of feeding movement to said drive and part, a power source for said means, means for connecting and disconnecting said drive with said first named means and including a feed control lever, mechanism associated with said first named means for preselecting during one feeding movement of said part the rate of the next feeding movement thereof, and means operatively associating said mechanism with said control lever for automatically actuating said mechanism to obtain the preselected rate of feeding movement when said control lever is moved to disengage said drive from said first named means.

5. In a machine tool having a movable part, a drive for said part, means for imparting different rates of feeding movement to said drive and part, a power source for said means, means for connecting said drive and said first named means and for automatically disconnecting the same at the completion of a feeding movement of said part, mechanism associated with said first named means for preselecting during one feeding movement of said part the rate of the next feeding movement thereof, and means operatively associating said mechanism with said second named means for automatically actuating said mechanism to obtain the preselected rate of feeding movement when said first named means and said drive are automatically disconnected.

6. In a machine tool having a movable part, a drive for said part, change speed gearing for imparting different rates of feeding movement to said drive and part, a power source for said gearing, a clutch for connecting said drive and gearing, a feed control lever for actuating said clutch, means for automatically moving said control lever at the conclusion of a feeding movement of said part to effect a disengagement of said clutch, mechanism associated with said gearing for preselecting during one feeding movement of said part the rate of the next feeding movement thereof, and means operatively associating said mechanism with said lever such that said mechanism is automatically actuated to shift said gearing to obtain the preselected rate of feeding movement when said lever is automatically moved to disengage said clutch.

7. In a machine tool having a movable part, a drive for said part, change speed gearing for imparting different rates of feeding movement to said drive and part, a power source for said gearing, a clutch for connecting said drive and gearing, a feed control lever for actuating said clutch, mechanism associated with said gearing for preselecting during one feeding movement of said part the following rate of feeding movement therefor and including elements movable toward and away from each other, and means operatively associating said mechanism with said control lever such that movement of said control lever to engage said clutch effects a movement of said elements in one direction while movement of the control lever to disengage said clutch effects a movement of said elements in the other direction.

8. In a machine tool having a slide provided with a drive and gearing for changing the rates of feeding movement of the drive and slide, means for connecting and disconnecting said drive and gearing, and a feed control lever for actuating said means; means for shifting said gearing and operatively associated with said gearing and said control lever such that movement of the latter to actuate said first named means effects a shifting of said gearing.

9. In a machine tool having a slide provided with a drive and change speed gearing for imparting different rates of feeding movement to said slide and drive, a clutch for connecting said drive and gearing, a feed control lever for actuating said clutch, and means for automatically moving said lever to disengage said clutch upon the completion of a feeding movement of said slide; mechanism for shifting said gearing, and means operatively connecting said mechanism with said lever such that said gearing is automatically shifted when said lever is automatically moved to disengage said clutch.

10. In a machine tool having a slide provided with a drive and change speed gearing for imparting different rates of feeding movement to said slide and drive, a clutch for connecting said drive and gearing, a feed control lever for actuating said clutch, and means for automatically moving said control lever to disengage said clutch upon the completion of a feeding movement of said slide; preselecting mechanism operatively associated with said gearing for preselecting during one feeding movement of the slide the rate of the following feeding movement thereof, and means operatively connecting said mechanism with said control lever such that the automatic movement of the latter to disengage the clutch automatically actuates said mechanism to obtain the preselected rate of feeding movement.

11. In a machine tool having a slide provided with a drive and change speed gearing for imparting different rates of feeding movement to said slide and drive, a clutch for connecting said drive and gearing, a feed control lever for actuating said clutch, and means for automatically moving said lever to disengage said clutch upon the completion of a feeding movement of said slide; preselecting mechanism operatively associated with said gearing for preselecting during one feeding movement of the slide the rate of the next feeding movement thereof and including parts movable in one direction to a position in which they may be indexed and in another direction to shift said gearing to obtain the preselected rate of movement, and means operatively associating said mechanism with said control lever such that the automatic movement of said lever to disengage said clutch automatically moves said parts in one direction and the movement of said lever to engage said clutch effects a movement of said parts in the other direction.

12. In a machine tool having a slide provided with an apron, a drive and change speed gearing in said apron for imparting different rates of feeding movement to the slide, a clutch in said apron for connecting said drive and gearing, a feed control lever carried by said apron for actuating said clutch, and mechanism carried by said apron and operatively associated with said gearing and said control lever such that movement of the lever to actuate said clutch effects an automatic shifting of said gearing.

13. In a machine tool having a slide provided with an apron, a drive and change speed gearing in said apron for imparting different rates of feeding movement to said slide, a clutch in said apron for connecting said drive and gearing, a feed control lever carried by said apron for actuating said clutch, means for automatically moving said control lever to disengage said clutch upon the completion of a feeding movement of said slide, and mechanism carried by said apron and having an operative connection with said gearing and said lever such that the automatic movement of said control lever effects through said mechanism an automatic shifting of said gearing.

14. In a machine tool having a slide provided with an apron, a drive and change speed gearing in said apron for imparting different rates of feeding movement to said slide, a clutch for connecting said drive and gearing and carried by said apron, a feed control lever carried by said apron for actuating said clutch, means for automatically moving said lever to disengage said clutch upon the completion of a feeding movement of said slide, preselecting mechanism carried by said apron and operatively associated with said gearing for preselecting during one feeding movement of the slide the rate of the following feeding movement thereof, and means operatively connecting said mechanism with said lever such that the automatic movement of the lever to disengage the clutch automatically actuates said mechanism to shift said gearing to obtain the preselected rate of feeding movement.

15. In a machine tool having a slide carrying a cross slide, a feed drive for said slide and a feed drive for said cross slide, change speed gearing for imparting different rates of movement to said slides and drives, clutches connecting said gearing with said drives, separate feed control levers for actuating said clutches, and a single mechanism operatively associated with said gearing and said levers such that movement of any one of said levers effects through said mechanism an automatic shifting of said gearing.

16. In a machine tool having a slide carrying a cross slide, a feed drive for said slide and a feed drive for said cross slide, change speed gearing, clutches for connecting said gearing with said drives, separate feed control levers for actuating said clutches, means for automatically moving one or the other of said levers to disengage its respective clutch upon the completion of a feeding movement of said slide or said cross slide, preselecting mechanism operatively associated with said gearing for preselecting during one feeding movement of the slide or cross slide the rate of the next feeding movement for the slide or cross slide, and means operatively connecting said mechanism with said levers such that the automatic movement of one or the other of the levers to disengage its respective clutch automatically actuates said mechanism to obtain the preselected rate of feeding movement for either the slide or the cross slide.

17. In a machine tool having a slide provided with a cross slide, a feed drive for said slide and a feed drive for said cross slide, change speed gearing for imparting different rates of movement to said drives and slides, clutches for connecting said drives to said gearing, feed control levers for actuating said clutches, means for automatically moving one or the other of said levers to disengage its respective clutch upon the completion of a feeding movement of said slide or said cross slide, mechanism for shifting said gearing, and means operatively connecting said mechanism with said levers such that said gearing is automatically shifted when one or the other of said levers is automatically moved to disengage its respective clutch.

18. In a machine tool having a cross slide, a feed drive therefor, change speed gearing for imparting different rates of movement to said slide and drive, a clutch for connecting said drive and gearing, a feed control lever for actuating said clutch, mechanism for shifting said gearing, and means operatively connecting said mechanism with said control lever such that movement of the lever to actuate said clutch automatically effects through said mechanism a shifting of said gearing.

19. In a machine tool having a cross slide, a feed drive therefor, change speed gearing for imparting different rates of movement to said slide and drive, a clutch for connecting said drive and gearing, a feed control lever for actuating said clutch, means for automatically moving said lever to disengage said clutch upon the termination of a feeding movement of said slide in opposite directions, mechanism for shifting said gearing, and means operatively interconnecting said mechanism and said control lever such that the automatic movement of the lever to disengage said clutch effects an automatic shifting of said gearing.

20. In a machine tool having a cross slide, a feed drive therefor, change speed gearing for imparting different rates of movement to said slide and drive, a clutch for connecting said drive and gearing, a feed control lever for actuating said clutch, means for automatically moving said lever to disengage said clutch upon a completion of a feeding movement of said cross slide in opposite directions, preselecting mechanism operatively associated with said gearing for preselecting during one feeding movement of the cross slide the rate of the following feeding movement thereof, and means operatively connecting said mechanism with said lever such that the automatic movement of the latter to disengage the clutch automatically actuates said mechanism to shift said gearing to obtain the preselected rate of feeding movement.

21. In a machine tool having a movable part, means for imparting different rates of movement to said part, and a mechanism operatively associated with said means for selecting the rate of movement of said part and comprising an indexible support, a plurality of pairs of actuating members carried by said support and having relative movement thereon, and means cooperating with said members when said support is indexed to selectively hold all but one pair thereof inactive.

22. In a machine tool having a movable part, means for imparting different rates of movement to said part, and a mechanism operatively associated with said means for selecting the rate of movement of said part and comprising an indexible support, a plurality of pairs of actuating members carried by said support and having relative movement thereon, means cooperating with said members when said support is indexed to selectively hold all but one pair thereof inactive, and means for imparting an equalized movement to the members of said one pair of members.

23. In a machine tool having a movable part, means for imparting different rates of movement to said part, and a mechanism operatively associated with said means for selecting the rate of movement of said part and comprising an indexible support, a plurality of pairs of actuating members carried by said support and having relative movement thereon, means cooperating with said members when said support is indexed to selectively hold all but one pair thereof inactive, and means for imparting an equalized movement to the members of said one pair of members, said last named means including cam portions on said members and a movable element provided with camming portions cooperating therewith.

24. In a machine tool having a movable part, means for imparting different rates of movement to said part and a mechanism operatively associated with said means for selecting the rate of movement for said part and comprising a linearly indexible support, a plurality of pairs of actuating members carried by said support and having relative movement thereon, and means cooperating with said members when said support is linearly indexed to selectively hold all but one pair thereof inactive.

25. In a machine tool having a movable part, means for imparting different rates of movement to said part and a mechanism operatively associated with said means for selecting the rate of movement of said part and comprising an indexible support, a plurality of pairs of actuating members pivotally carried by said support, and means cooperating with said members when said support is indexed to selectively hold all but one pair thereof against pivotal movement.

26. In a machine tool having a movable part, means for imparting different rates of movement to said part and a mechanism operatively associated with said means for selecting the rate of movement for said part and comprising an indexible support, a plurality of pairs of actuating members carried by said support with the members of each pair slidably arranged thereon, and means cooperating with said members when said support is indexed to selectively hold all but one pair thereof against sliding movement.

27. In a machine tool having a movable part, means for imparting different rates of movement to said part and a mechanism operatively associated with said means for selecting the rate of movement of said part and comprising a linearly indexible support, a plurality of pairs of actuating members carried by said support with the members of each pair pivotally mounted thereon, and means cooperating with said members when said support is linearly indexed to selectively hold all but one pair thereof against pivotal movement.

28. In a machine tool having a movable part, means for imparting different rates of movement to said part and a mechanism operatively associated with said means for selecting the rate of movement of said part and comprising a linearly indexible support, a plurality of pairs of actuating members carried thereby with the members of each pair having sliding movement thereon transversely to its indexing movement, and means cooperating with said members when said support is indexed to selectively hold all but one pair thereof against sliding movement.

29. In a machine tool having a movable part, means for imparting different rates of movement to said part and a mechanism operatively associated with said means for selecting the rate of movement of said part and comprising an indexible support, a plurality of pairs of actuating members carried by said support and having relative movement thereon, said members each being provided with projections for cooperation with shiftable elements forming a portion of said first named means, and means for selectively moving relative to said support one pair of members at a time.

30. In a machine tool having a movable part, means for imparting different rates of movement to said part and a mechanism operatively associated with said means for preselecting during one operative step of the work cycle the rate of movement of said part for the next operative step and comprising an indexible support, a plurality of pairs of actuating members carried by said support and having relative movement thereon, said support being indexed during one step to selectively bring one or another of said pairs of members to a position where the members thereof can be moved to obtain the preselected rate of movement for said part, and means for moving the members of said pair of members upon the completion of the prior operative step.

31. In a machine tool having a movable part, means for imparting different rates of movement to said part and a mechanism operatively associated with said means for selecting the rate of movement of said part and comprising an indexible support, a plurality of actuating members carried by said support and having relative movement thereon, and means cooperating with said members when said support is indexed to selectively hold certain of said members inactive.

32. In a machine tool having a movable part, means for imparting different rates of movement to said part and a mechanism operatively associated with said means for selecting the rate of movement of said part and comprising an indexible support, a plurality of actuating members carried by said support and having relative movement thereon, said members each being provided with projections for cooperation with shiftable elements forming a portion of said first named means, and means for operatively moving said members relative to said support to effect a shifting movement of one or another of said shiftable members.

33. In a machine tool having a movable part, means for imparting different rates of movement to said part and a mechanism operatively associated with said means for selecting the rate of movement of said part and comprising an indexible support, a plurality of pairs of actuating members carried by said support and having relative movement thereon, and means cooperating with said members when said support is indexed to selectively hold certain of said pairs of members inactive.

34. In a machine tool having a movable part, means for imparting different rates of movement to said part and a mechanism operatively associated with said means for selecting the rate of movement of said part and comprising an indexible support, a plurality of pairs of actuating members carried by said support and having relative movement thereon, means cooperating with said members when said support is indexed to selectively hold a portion of said pairs of members inactive while the remainder are active, and means for imparting an equalized movement to the members of said remainder.

35. In a machine tool having a movable part, means for imparting different rates of movement to said part and a mechanism operatively associated with said means for selecting the rate of movement for said part and comprising a linearly indexible support, a plurality of pairs of actuating members carried by said support and having relative movement thereon, and means cooperating with said members when said support is linearly indexed to selectively hold certain of said pairs of members inactive.

36. In a machine tool having a movable part, means for imparting different rates of movement to said part and a mechanism operatively associated with said means for selecting the rate of movement of said part and comprising an indexible support, a plurality of pairs of actuating members pivotally carried by said support, and means cooperating with said members when said support is indexed to selectively hold certain of said pairs of members against pivotal movement.

37. In a machine tool having a movable part, means for imparting different rates of movement to said part and a mechanism operatively associated with said means for selecting the rate of movement for said part and comprising an indexible support, a plurality of pairs of actuating members carried by said support with the members of each pair slidably arranged thereon, and means cooperating with said members when said support is indexed to selectively hold certain of said pairs of members against sliding movement.

38. In a machine tool having a rotatable spindle and a slide movable relative thereto, a drive for said slide, change speed gearing for imparting to said drive and slide different rates of feeding movement in relation to spindle speeds and operatively connected with said spindle, means for connecting and disconnecting said change speed means and said drive including a feed control lever, mechanism for shifting said change speed means to obtain all of the different rates of feeding movement for said slide in relation to spindle speeds and which can be imparted thereto by said change speed means, and means interconnecting said mechanism and said control lever such that movement of the latter actuates said mechanism.

39. In a machine tool having a slide, a drive for said slide, change speed gearing for imparting different rates of feeding movement to said drive and slide and carried by the latter, a power source for said gearing, means for connecting and disconnecting said gearing and said drive including a feed control lever, mechanism for shifting all of said gearing to obtain all of the different rates of feeding movement for said slide that can be produced thereby, and means interconnecting said mechanism and said control lever such that movement of the latter actuates said mechanism.

40. In a machine tool having a rotatable spindle and a slide movable relative thereto, a drive for said slide, change speed means for imparting different rates of feeding movement to said drive and slide in relation to spindle speeds and operatively connected to said spindle, means for connecting said drive and said change speed means and for automatically disconnecting the same at the completion of a feeding movement of said slide, mechanism for shifting said change speed means to obtain all of the different rates of feeding movement for said slide which can be produced by said means, and means operatively connecting said mechanism and said second named means such that said mechanism is automatically actuated when said drive and change speed means are automatically disconnected.

41. In a machine tool having a slide, a drive for said slide, change speed gearing for imparting different rates of feeding movement to said drive and slide and carried by the latter, a power source for said gearing, means for connecting said drive and said gearing and for automatically disconnecting the same at the completion of a feeding movement of said part, mechanism for shifting all of said gearing to obtain all of the different rates of feeding movement for said slide which can be imparted thereto by said gearing, and means operatively connecting said mechanism and said means such that said mechanism is automatically actuated when said drive and gearing are automatically disconnected.

JOHN J. N. VAN HAMERSVELD.